Figure 10:
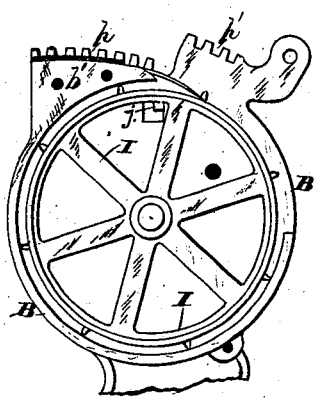

T. B. JEFFERY.
Ticket-Printing Press.
No. 209,762. Patented Nov. 12, 1878.
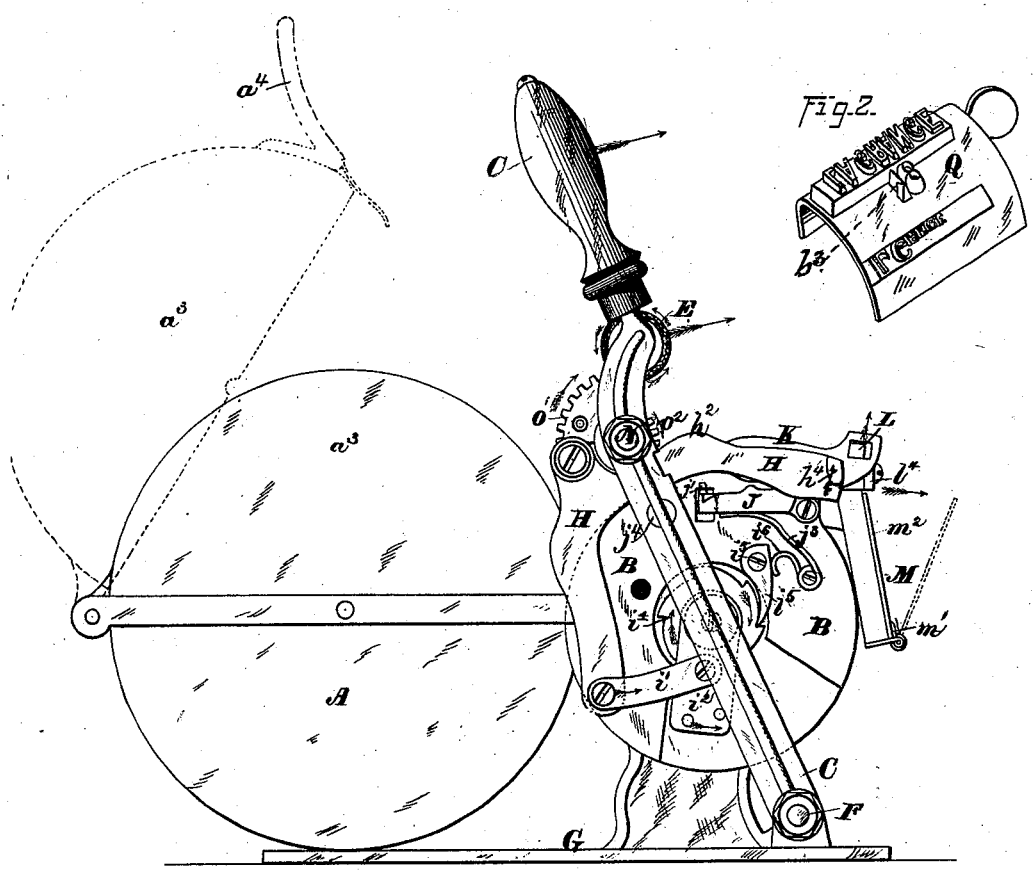

4 Sheets—Sheet 2.
T. B. JEFFERY.
Ticket-Printing Press.
No. 209,762.  Patented Nov. 12, 1878.
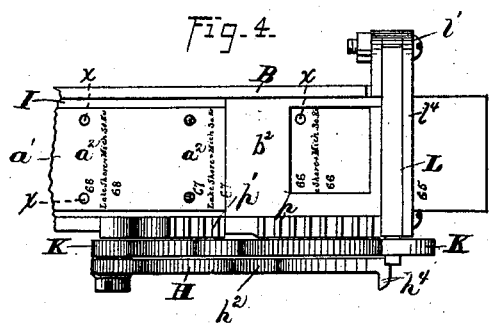
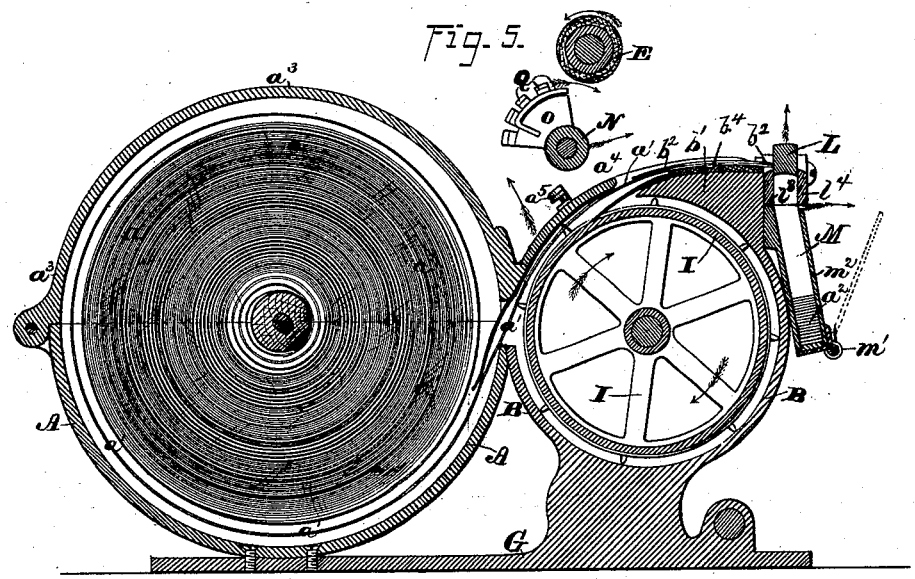
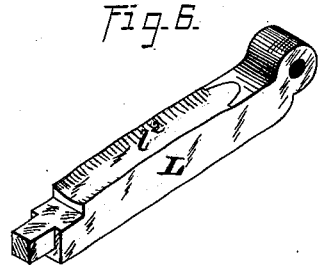
WITNESSES:
Jas. E. Hutchinson
Penn Halsted
INVENTOR.
Thomas B. Jeffery.
by John J. Halsted,
his Atty T. B. JEFFERY.
Ticket-Printing Press.
No. 209,762. Patented Nov. 12, 1878.
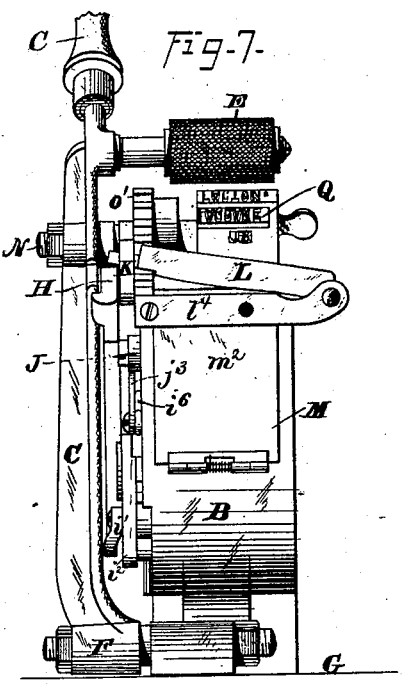
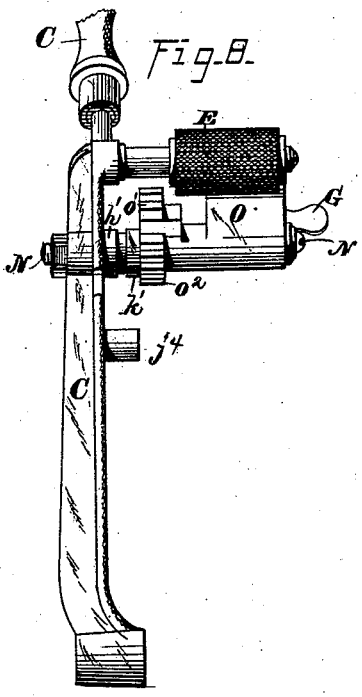
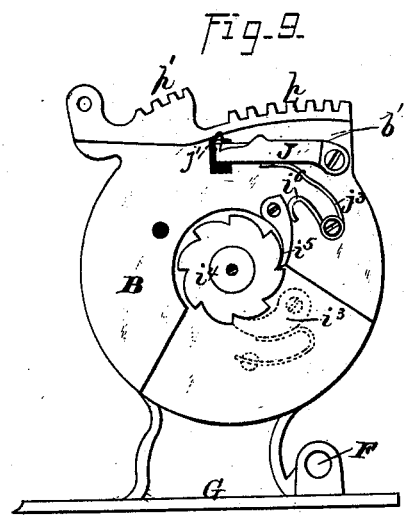
WITNESSES
Jas. O. Hutchinson.
Jenn'e Halsted
INVENTOR
Thomas B. Jeffery
by John J. Halsted
his atty.

4 Sheets—Sheet 4.

T. B. JEFFERY.
Ticket-Printing Press.

No. 209,762. Patented Nov. 12, 1878.

UNITED STATES PATENT OFFICE.

THOMAS B. JEFFERY, OF CHICAGO, ILLINOIS.

IMPROVEMENT IN TICKET-PRINTING PRESSES.

Specification forming part of Letters Patent No. 209,762, dated November 12, 1878; application filed June 18, 1878.

*To all whom it may concern:*

Be it known that I, THOMAS B. JEFFERY, of Chicago, in the county of Cook and State of Illinois, have invented certain new and useful Improvements in Ticket Printing and Registering Apparatus; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to enable ticket-agents at any station on the road to furnish a passenger with a railway-ticket for any destination or other station on their road by using only one uniform and peculiar character of ticket-blank, the same kind of blank-strips being supplied to all the ticket-agents on the road, and to enable each agent to make and keep mechanically a register or account of all such tickets as are sold by him.

The invention consists, mainly, in a machine adapted for using a single strip of paper, partially printed for tickets, and partially printed for register-spaces or coupon-checks, alternating with each other—first a ticket, and then after it its correspondingly-numbered and fellow coupon, one after the other continuously throughout the length of the strip—each ticket having appropriate words to designate the name of the road, and other matters, if desired, and also a consecutive number on every ticket, and a corresponding consecutive number on every register-space or coupon-check. This strip is then formed into a roll, and inserted in my improved machine, which is so constructed that when operated it will print, with appropriate dies, on the ticket the date of sale and the name or other designation (or both) of the destination, and also print the same name or designation on the register or coupon; and, if desired, the value or price of the ticket may be printed on such coupon. The machine then moves the strip forward a proper distance, and, by means of a single movable cutter, having two parallel cutting-edges, completely severs the register-space or coupon from between two tickets, and by the same act severs and discharges a perfected and completed ticket.

The machine is constructed with means for inking the type, printing, feeding, cutting off separately from each other, but simultaneously, each ticket and its fellow coupon, retaining such coupon in an appropriate receptacle, and discharging the purchased ticket, all instantly and automatically.

Figure 11:
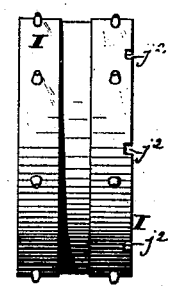
Figure 12:
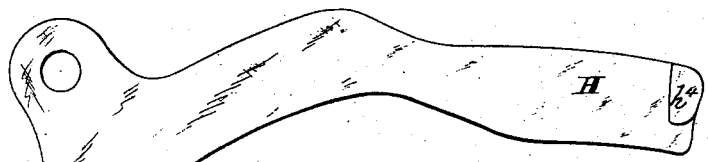
Figure 13:
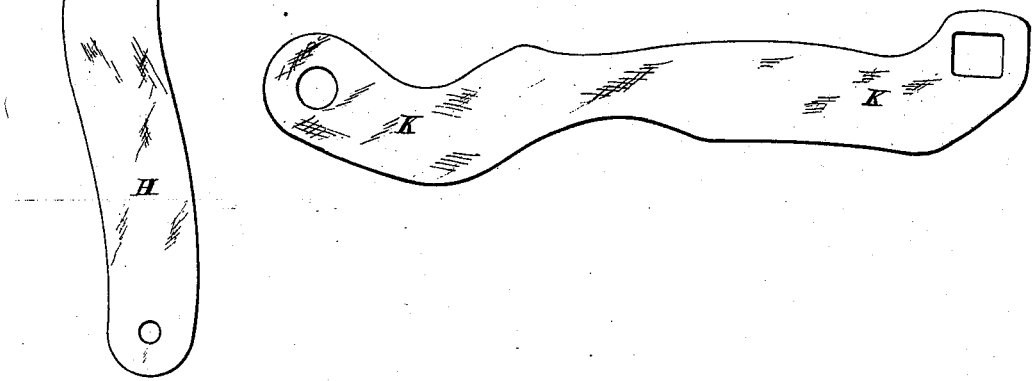

In the drawings, Figure 1 is a side elevation of a machine embodying my improvements; Fig. 2, a perspective of the removable die; Fig. 3, a side elevation of segmental gear on the die-carrier; Fig. 4, a detail, showing, in plan, the cutter and adjacent parts, and the strip of paper ready for cutting both the ticket and the register from the continuous strip of paper; Fig. 5, a central longitudinal section of the machine; Fig. 6, an under-side view of the double-edged cutter; Fig. 7, an end elevation of the machine; Fig. 8, a side elevation of the hand-lever, showing all the devices which are connected to it; Fig. 9, a side elavation of the drum-case, with certain attachments; Fig. 10, an elevation of the opposite side of the drum-case, with its removable head off; Fig. 11, a front elevation of the toothed drum; Fig. 12, the two-armed lever; and Fig. 13, the cutter-actuating lever.

A is the reel-case, for holding the continuous paper strip $a^1$, which contains lengthwise of the strip a series of tickets, and also a series of stubs or coupons or registering-checks, $a^2$, these coupons alternating with the tickets, as shown in Fig. 4, so that every ticket has just behind it on the strip its own corresponding coupon, and with (or designed to have) consecutive numbers for all the tickets, and consecutive numbers for all the coupons, the number of each coupon according with that of the ticket preceding it, the coupons (and not the tickets) being provided with holes $x$, whereby the strip is moved through the machine. The reel-case has a hinged cover, $a^3$, constituting one-half of the case, and having a projecting guide, $a^4$, attached to it, which partly encircles the feeding drum or roller; and which projection also serves, by the aid of a turnscrew or nut, $a^5$, to hold the cover in its locked position. B is a case inclosing the feeding drum or cylinder, and serving also to support other parts of the operative mechanism. This case is made with a curved platen or bed, $b^1$, and with a correspondingly-arched toothed segment, $p'$, hereinafter named, and with another curved toothed rack, $p$, for purposes hereinafter named. Over the bed $b^1$ is a plate, $b^2$, having a quadrangular opening, to permit the type to imprint the paper passing under such plate, this plate extending forward to the cutter-bar, and in the yielding part or surface of the platen is a small piece of metal, $b^4$, to receive and resist the impact of the cutting or indenting die $b^3$. C, a hand-lever for operating the machine, and which also supports the printing-dies, (part or all of which may be removable, to be substituted by others at will,) and also the inking-roller E. This lever C has its fulcrum at any suitable point, but preferably at F, on or near the base G of the machine. H is a bent lever, actuated by the lever C, to give the required movement to the feed-drum or roller I, through the agency of the link $i^1$, which is connected to the arm $i^2$, hung loosely on the axis of the drum. This arm $i^2$ carries on its under side a spring-pawl, $i^3$, which engages successively with one of the teeth of circular rack $i^4$ on one end of the drum as the lever C is moved in one direction, and carries said drum forward the predetermined distance as the lever is moved in the opposite direction. A detaining-pawl, $i^5$, actuated by a spring, $i^6$, lodges in one of the teeth of rack $i^4$ after every forward movement.

J is a lever-catch, having a tooth, $j^1$, which lodges in one of the notches $j^2$ on the feed-drum, to aid in holding the same in a fixed and steady position when not being moved for feeding. This tooth is normally kept in engagement with one of these notches by means of the spring $j^3$, which exerts a constant pressure upward upon the lever-catch J, and this catch at the proper period is released from its notch by means of a pin or friction-roller, $j^4$, on the inner side of the hand-lever C. This same roller $j^4$, acting against the under side of one arm of the bent lever H, serves to operate it in one direction, while another friction-roller, $h^1$, on the same lever C acts upon a swell or cam, $h^2$, on the upper side of the same arm of lever H, and actuates it in the other direction, both actions being positive. A stop, $h^4$, on lever H limits the movement of this lever in its forward movement.

K is another lever, actuated by the hand-lever C through the agency of the before-named friction-roller $j^4$, which lifts it, and of the friction-roller $h'$ on lever C, which depresses it, both actions being positive. This lever K has an opening to receive one end of the cutter-bar L, which latter is pivoted or journaled at its opposite end, as shown at $l^1$. This cutter-bar is double-edged, and of a breadth about equal to that of the coupons or register-checks to be cut off from the strip, (one coupon for each ticket sold and severed from the same strip;) and it is nearly quadrangular in cross-section, its under or cutting side being preferably slightly concave, as shown at $l^2$, to afford better cutting-edges; and two steel plates, $l^3$ $l^4$, having an open space between them, serve as the other cutting-edges, and between which the cutter-bar L descends by a shearing movement or cut, and severs the coupon or stub from the strip and from the ticket which belongs to and corresponds with it, after both shall first have been printed in the machine with the destination, &c., as hereinafter described. When so severed the ticket for the traveler or purchaser drops out of the machine at its front or into the hand of the operator, and the stub or register $a^2$ falls down between the stationary cutter-plates $l^3$ $l^4$ into the box M, provided for them, and where these register-strips deposit themselves upon each other successively in the order of their numerals, and may be removed at the end of a day's sale or otherwise; and they compose a perfect record of all tickets sold, and of the destination and price of each, or such information as may be preferred, according to the character of the type employed both for the tickets and their respective and corresponding coupons. The box M has a spring, $m^1$, on its lid $m^2$, to render the latter self-closing.

On the lever-handle C is a fixed shaft, N, on which is supported the die carrier or holder O, and which is adapted to make a partial rotation thereon at proper periods by means of the two partial or segmental gears $o^1$ and $o^2$, which engage respectively and successively with the two stationary segmental racks $p$ and $p'$, the larger gear, $o^1$, engaging with the rack $p$ to effect the printing of the ticket and its coupon, and the smaller gear, $o^2$, engaging with the rack $p'$ to bring the die and its type into more rapid contact with the inking-roller E, which is also affixed to the hand-lever C, and always in position for use at every full movement of this lever.

Q is one of a series of removable dies, on which are types or letters for printing the destination for which any given ticket is sold; and this destination is placed twice on each die, so that when a ticket for a given destination on the line has been sold, and the proper die having the type for such destination inserted in the holder and the machine actuated, the name of said destination shall be printed both upon the purchaser's ticket and upon the stub or register retained in the machine at the selling-station.

Upon the sale of another ticket for another destination another die, having that destination upon it, is substituted in the holder for the last one used; and upon working the handle this new destination is printed upon the ticket and upon its corresponding stub or register, and both are cut off, as before, by the same movement of the handle, the ticket delivered, and its stub retained, and in the same manner for every sale. It will be evident that the date or day on which the tickets are sold may also be printed at the same time both on the ticket and on its registering-stub, if desired, as also any other matter found desirable, by having the dies adapted therefor. But a peculiar feature both of my ticket-strip and of my machine and its operation is that all the ticket-blanks may be precisely alike, excepting their consecutive numbers; and that neither ticket nor stub has a destination printed upon it before going into my machine; and that the stub follows a ticket continuously throughout the length of a single strip; and that I do not pass two separate strips through the machine at the same time, one for the tickets and one for the registers; that only one cutter is needed, and that one a double one, acting across the strip to sever two pieces—namely—the ticket and its check-stub or register, at the same moment, and by one and the same act.

I have not shown any type for dates, and make no claim for that in this application.

On the adjustable or removable die Q, I sometimes affix a numeral or figure of hard steel, the object of which is to indicate the number which the company may adopt to designate a destination-station; and such numeral or character die $b^3$ I make of hard steel, so that it may cut or indent as well as print the ticket. This affords a useful security for the road or company in case the word representing the destination should be improperly erased or altered.

I claim—

1. In a ticket-printing machine, a hinged covered case for containing a coil or roll of ticket-blanks, having a projecting guide attached to the cover and partly encircling the feed-roller, substantially as shown and described.

2. The case B, for containing the feed-roller, made with a curved platen, $b^1$, and with the toothed segment $p$, for guiding the type to the paper, and with the toothed segment $p'$, for turning the type under the ink-roller.

3. In combination with the handle or lever C, the ink-roller, the type-holder, and rollers for operating the knife and the feed-drum, all being supported on and carried by such handle.

4. The type-holder O, provided with segments of toothed gearing of different radii or curvatures, in combination with stationary racks adapted therefor, substantially as and for the purposes described.

5. In combination, mechanism, substantially as described, for feeding a continuous strip of paper a distance equal to a ticket and its connected coupon, and the double-edged knife, operating by a single shearing cut to sever such ticket from its adjacent coupon and to sever both from the strip, substantially as shown and described.

6. In combination, mechanism, substantially as described, for feeding a continuous strip of paper a distance equal to a ticket and its connected coupon, the double-edged knife, and the cutting-plates $l^3$ $l^4$, between which the severed coupons or register-pieces pass, while the ticket is discharged from the machine.

7. In combination with the lever C and its actuating-rollers, the bell-crank lever H, having on one of its arms a curved edge, and on its other arm the pivoted link $i^1$, to transmit motion to the feed roller or drum.

8. In combination with the lever C and with the double-edged knife, the pivoted lever operating the same having a curved edge, on which its operating-roller moves, and an elongated or oblong aperture, into which the end of the knife or knife-stock is inserted.

9. A removable die-plate for a ticket-printing machine, provided not only with the requisite type for printing, but also furnished with a hardened sharp indenting-type of higher elevation than the printing-type, and adapted to make an ineffaceable impression in the body of the ticket, for the purpose set forth.

10. In combination with levers C and K, a vibrating shearing-knife having two parallel cutting-edges, in combination with two stationary cutting-edges, between which such knife works to sever a registering piece or coupon from its corresponding ticket and also from the continuous strip of paper, substantially as shown and described.

11. In combination, the feeding apparatus, the devices for severing the ticket and register from a continuous strip, and a receptacle or box, into which the severed registering-piece falls, substantially as and for the purposes set forth.

THOMAS B. JEFFERY.

Witnesses:
FRANK ROSENGREN,
FRANK HAAG.